(12) United States Patent
Shitrit

(10) Patent No.: US 8,694,655 B2
(45) Date of Patent: *Apr. 8, 2014

(54) CONFIGURING OUTPUT ON A COMMUNICATION DEVICE

(75) Inventor: Danny Ben Shitrit, Tel Aviv (IL)

(73) Assignee: Facebook, Inc., Menlo Park, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/081,430

(22) Filed: Apr. 6, 2011

(65) Prior Publication Data

US 2011/0292160 A1    Dec. 1, 2011

Related U.S. Application Data

(63) Continuation of application No. 11/359,750, filed on Feb. 23, 2006, now Pat. No. 7,930,409.

(60) Provisional application No. 60/655,454, filed on Feb. 23, 2005.

(51) Int. Cl.
    *G06F 15/16* (2006.01)

(52) U.S. Cl.
    USPC ........... 709/228; 709/220; 709/224; 709/223; 709/203; 713/100; 715/771; 370/261; 370/352; 370/229

(58) Field of Classification Search
    USPC .................. 709/220, 224, 223, 228; 713/100; 715/771; 370/261, 352, 229; 348/14.01–14.1
    See application file for complete search history.

(56) References Cited

U.S. PATENT DOCUMENTS

| | | | |
|---|---|---|---|
| 6,301,440 B1 | 10/2001 | Bolle et al. | |
| 6,453,336 B1 * | 9/2002 | Beyda et al. | 709/204 |
| 6,493,758 B1 * | 12/2002 | McLain | 709/227 |
| 6,567,121 B1 | 5/2003 | Kuno | |
| 6,587,129 B1 | 7/2003 | Lavendel et al. | |
| 7,221,386 B2 | 5/2007 | Thacher et al. | |
| 7,296,295 B2 | 11/2007 | Kellerman et al. | |
| 7,417,959 B2 * | 8/2008 | Dorner et al. | 370/260 |
| 7,930,409 B2 | 4/2011 | Shitrit | |
| 2002/0071026 A1 * | 6/2002 | Agraharam et al. | 348/14.08 |

(Continued)

FOREIGN PATENT DOCUMENTS

WO    WO 0129642 A1 *    4/2001

OTHER PUBLICATIONS

U.S. Appl. No. 11/359,750, Feb. 9, 2009, Office Action.
U.S. Appl. No. 11/359,750, Jul. 22, 2009, Office Action.

(Continued)

*Primary Examiner* — Wing F Chan
*Assistant Examiner* — Hitesh Patel
(74) *Attorney, Agent, or Firm* — Keller Jolley Preece

(57) ABSTRACT

In one general sense, display of content communicated by a sender communication device to a destination communication device may be enabled by receiving, at a destination communication device, content to be displayed by the destination communication device. Characteristics of a display of the received content by the destination communication device may be algorithmically identified in accordance with display configuration settings for the destination communication device. Based on the identified characteristics, at least one change to be made to capture configuration settings at a capturing communication device used to capture the received content may be identified. At least one alternative capture configuration setting may be communicated to the capturing communication device. Content that is captured by the capturing communication device is received at the destination communications device based on the alternative capture configuration setting communicated.

17 Claims, 16 Drawing Sheets

(56) References Cited

U.S. PATENT DOCUMENTS

| | | |
|---|---|---|
| 2003/0208543 A1 | 11/2003 | Enete et al. |
| 2004/0139233 A1 | 7/2004 | Kellerman et al. |
| 2004/0183897 A1* | 9/2004 | Kenoyer et al. ............ 348/14.08 |
| 2005/0055416 A1 | 3/2005 | Heikes et al. |
| 2005/0068905 A1 | 3/2005 | Dorner et al. |
| 2006/0085515 A1 | 4/2006 | Kurtz et al. |
| 2006/0158439 A1 | 7/2006 | Luo et al. |
| 2006/0245379 A1* | 11/2006 | Abuan et al. .................. 370/261 |
| 2013/0073612 A1 | 3/2013 | Shitrit |

OTHER PUBLICATIONS

U.S. Appl. No. 11/359,750, Nov. 12, 2009, Office Action.
U.S. Appl. No. 11/359,750, Apr. 13, 2010, Office Action.
U.S. Appl. No. 11/359,750, Dec. 14, 2010, Notice of Allowance.
U.S. Appl. No. 13/620,620, Mar. 21, 2013, Office Action.
U.S. Appl. No. 13/620,620, Oct. 1, 2013, Office Action.

* cited by examiner

1500

| Contacts accessed | Communication Type | User-state | User Actions |
|---|---|---|---|
| Nikita (25) 1510 | *Video Chat (13)* 1520 | *Home Computer (10)* 1530 | *Increase microphone volume (9)* 1540 |
| | | wireless phone (2) | maintin current microphone volume (1) |
| | VOIP (2) | | |
| | Text Chat (6) | | |
| Tyler (8) | VOIP (6) | *Home Computer (4)* | *decrease microphone volume (3)* |
| | | wireless phone (2) | maintin current microphone volume (1) |
| | email (2) | | |
| Danny(8) | VOIP (6) | *Home Computer (4)* | *decrease microphone volume (3)* |
| | | wireless phone (2) | maintin current microphone volume (1) |
| | email (2) | | |

| Applications accessed | User-state | User Actions |
|---|---|---|
| Email Client (25)<br>1610 | *Home Computer (12)*<br>1620 | *Home, check home inbox (10)*<br>1630 |
| | | Office, check work inbox (2) |
| | wireless phone (3) | |
| | work computer (20) | |
| Web-Browser (11) | *PDA (6)* | *Home, check home inbox (4)* |
| | | Office, check work inbox (2) |
| | wireless phone (3) | |
| | work computer (20) | |
| IM Client (11) | *PDA (6)* | *Home, check home inbox (4)* |
| | | Office, check work inbox (2) |
| | wireless phone (3) | |
| | work computer (20) | |

*FIG. 16*

CONFIGURING OUTPUT ON A COMMUNICATION DEVICE

CROSS-REFERENCE TO RELATED APPLICATIONS

This is application is a continuation of U.S. patent application Ser. No. 11/359,750, filed Feb. 23, 2006 (U.S. Pat. No. 7,930,409), titled CONFIGURING OUTPUT ON A COMMUNICATION DEVICE, and claims the benefit of U.S. Provisional Application No. 60/655,454, filed Feb. 23, 2005, titled COMMUNICATIONS SYSTEM, and are incorporated by reference in their entirety.

TECHNICAL FIELD

This document relates to device communications.

BACKGROUND

Communication devices include hardware and software with parameters that may be configured.

DESCRIPTION OF DRAWINGS

FIG. 15 illustrates an exemplary table of recorded instances of user communication-behavior.

FIG. 16 illustrates an exemplary table of recorded instances of user application-behavior.

DETAILED DESCRIPTION

Users may rely on a variety of applications and platforms to exchange communications. These applications and platforms often include a variety of controls that are used to render content. To illustrate, a conferencing application may include application controls for microphone volume and speaker volume in addition to device controls for microphone volume and speaker volume. In one example, a user may experience frustration using one or more applications if the user is unable to achieve desired performance with application controls due to constraints that relate to system controls. In another example, a user may prefer certain display configurations in a first environment (e.g., prefer a brighter display in direct outdoor sunlight or prefer less microphone sensitivity crowds with higher) and prefer a different configuration in a second environment (e.g., turn off a backlit display when indoors or preferring greater microphone sensitivity when indoors). As a result, alternative display configuration settings may be identified. The destination display device then may be reconfigured, for example, as a result of the user instructing the destination display to adopt the alternative display configuration setting.

As noted above, the alternative display configuration settings may depend on the state (e.g., environment) of the display device. To further illustrate, the alternative display configuration setting may depend on whether the user is in the office (e.g., as determined by an Internet Protocol address), at home (e.g., as determined by a Global Positioning System location), and/or using a wireless phone (e.g., as identified by the wireless phone itself in establishing a communications session). In a variation, as a communications session is being established with a "noisy" friend, the user's device initially attempts to derive the state of remote device for the "noisy" friend. For example, the user's device may sample a short audio communication or exchange parameters describing device states. If the user's device detects that the "noisy" friend is associated with a "noisy" state, the user's device may load an alternative display configuration setting known to work or previously used for "noisy" friend.

Thus, in one sense, a device may maintain a list of alternative display configuration settings associated with one or more identities appearing in a contact list. In another sense, the device may maintain a list of alternative display configuration settings associated with one or more states for the device.

Figure 1:
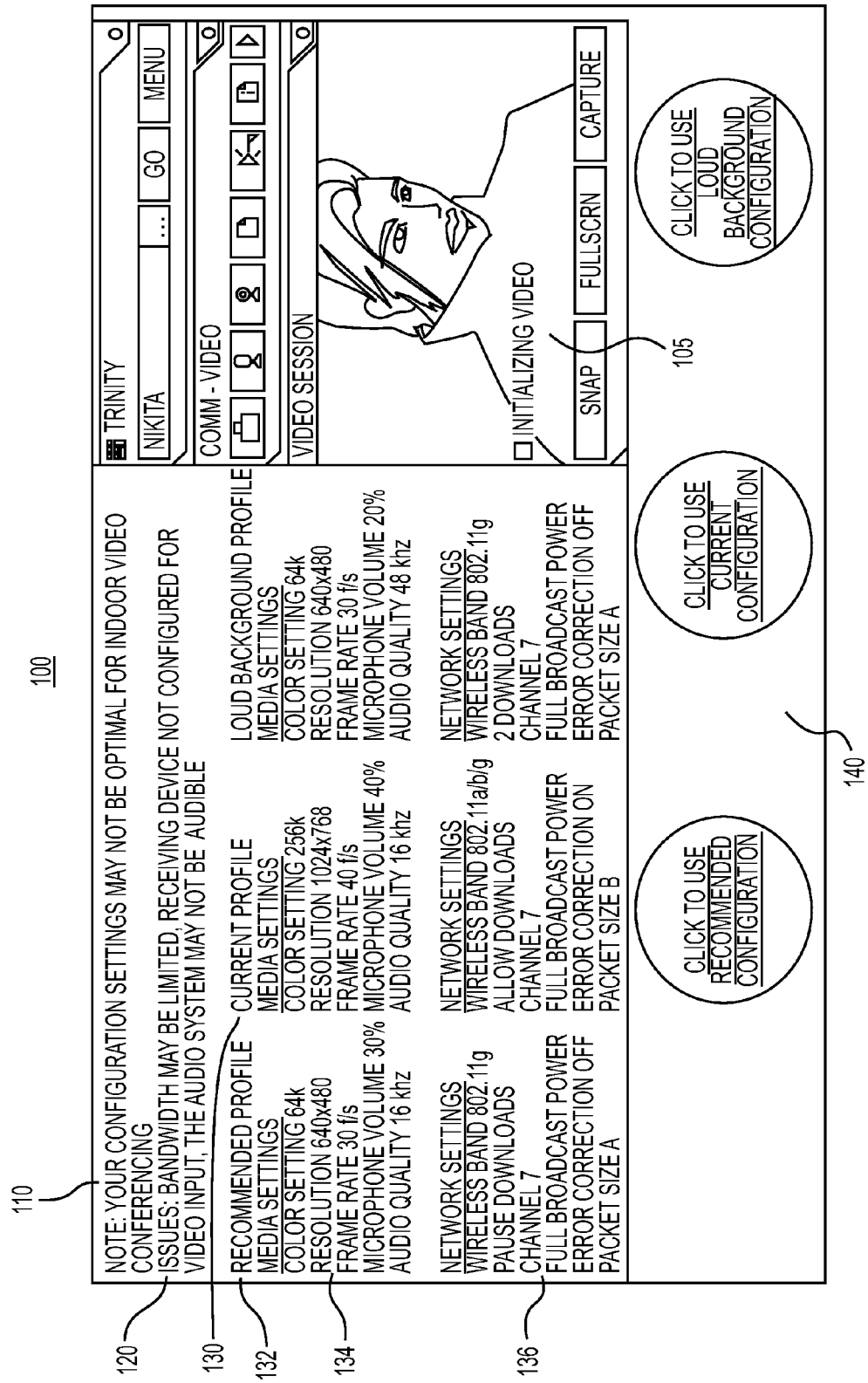
FIG. 1 is an example of a graphical user interface of a system to provide configuration adjustment to a local device.

FIG. 1 illustrates a graphical user interface (GUI) 100 of an exemplary system configured to provide configuration adjustment to a local device. GUI 100 includes a display screen 105, a configuration warning 110, a configuration issues notification 120, a list of configuration profiles 130, and configuration selection options 140.

A user on a destination communications device attempting to exchange communications across a network is shown the message "initializing video" in the display screen 105 while the destination communications device identifies display configuration settings. After identifying display configurations settings, the destination communication system may identify at least one alternate display configuration setting. As a result, the destination communication device may display the configuration warning 110, the configuration issues notification 120, the list of configuration profiles 130, and the configuration selection options 140.

The configuration warning 110 indicates that the display configuration setting may not be optimal for the intended communication session, which in this case is an indoor video conferencing session.

The configuration issues notification 120, which describes expected difficulties that may be encountered if the display configuration setting is used. As shown, at least one issue in the configuration issues notification 120 indicates that the audio portion of a video conference may not be audible due to current microphone settings.

The list of configuration profiles 130 displays at least one alternative display configuration setting and includes profile titles 132, media setting configurations 134, and network setting configurations 136. The list of configuration profiles 130 may be stored locally and/or on a host. In one implementation, the list of configuration profiles 130 is specific to a state and/or identities with whom a user is exchanging communications. The profile titles 132 include descriptions of the type or utility of a given profile. As shown, the profile titles include a recommend profile, a current profile, and a loud background profile. The media setting configurations 134 include parameters that configure the input or reproduction of media for an application or with respect to a communications sessions. For example, a microphone volume level may be configured to be responsive to a state identified in the profile. The network setting configurations 136 include configuration parameters related to the characteristics of content exchanged across a network and the resulting impact on a network. For example, the network setting configuration may regulate network type, signal strength, error correction and packet size.

The configuration selection options 140 enable a user to preserve the display configuration settings, or, select an alternative display configuration setting. As shown, the user is presented with options to "click to use recommend configuration", "click to use current configuration", or "click to use loud background configuration".

It should be noted that GUI 100 (and the other GUIs that follow) represent exemplary displays and configurations. Other displays, configurations, applications, and implementations may be used that feature different components, parameters, and/or organizations. For example, a user may be presented with configuration selection options other than those shown with respect to the configuration selection options 140 shown in FIG. 1.

Figure 2:
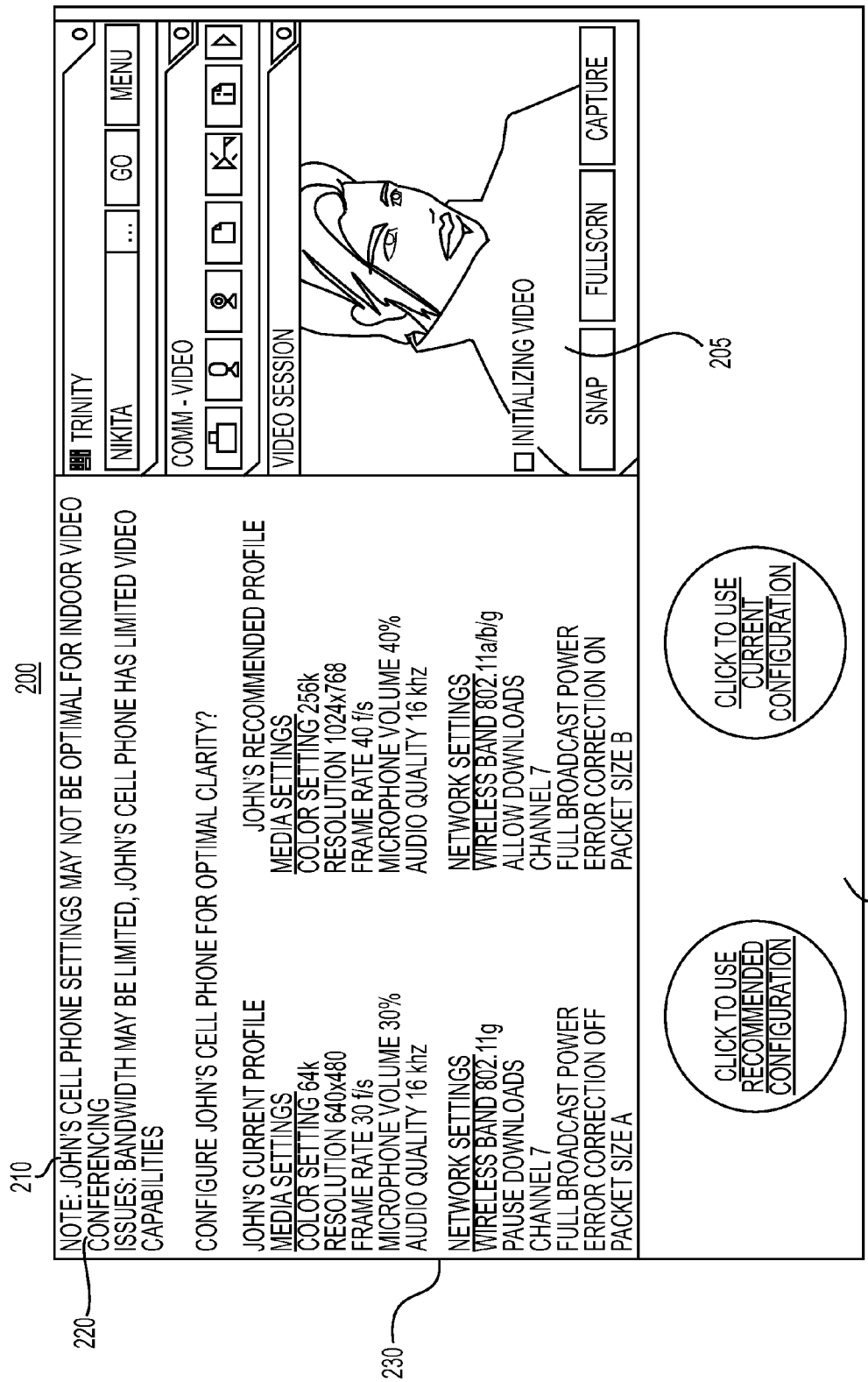
FIG. 2 is an example of a graphical user interface of a system to provide configuration adjustment to a device across a network.

FIG. 2 illustrates a GUI 200 of an exemplary system that enables a user on a sender communication device to recommend a configuration to destination communication device. As shown, GUI 200 includes a local display screen 205, an external configuration warning 210, an external configuration issues notification 220, a list of external configuration profiles 230, and configuration selection options 240.

In one implementation, GUI 200 is generated in response to a sending user on a sender communication device suggesting a configuration to a destination communication device. A sending user may maintain a profile for a user associated with the destination communication device. For example, a sending user may maintain alternative display configuration settings for a user working in a "noisy" state. As a result, in response to determining that the sending user is attempting to establish communications with a user associated with the "noisy" state, the sending communication system may suggest an alternative display configuration setting in a request to establish communications. As a result of receiving the request, GUI 200 may be displayed on the destination communication device. The recipient user then may elect to reconfigure display configuration settings using the alternative display configuration setting.

As communications are being established, an "initializing video" message appears in the local display screen 205 of the destination communication device. The destination communication device identifies display configuration settings that control the display of content by the destination communication device. After identifying the display configuration settings, at least one alternative display configuration setting may be identified. For example, the sending communication system may transmit a message suggesting one or more alternative display configuration settings. Receipt of the message may trigger display of the external configuration warning 210, the external configuration issues notification 220, the list of external configuration profiles 230, and the configuration selection options 240.

The external configuration warning 210 describes the status of the current external configuration as either optimal or not optimal for the intended communication session. As shown, the external configuration warning 210 indicates that "John's cell phone settings may not be optimal for indoor video conferencing." The external configuration issues notification 220 describes specific issues that may be encountered during communication using existing settings. As shown, the external configuration issues notification 220 indicates that "bandwidth may be limited" and that "John's cell phone has limited video capabilities." In another example, imagery capture and display settings may include a problematic contrast parameter causing poor imagery content to be exchanged (not shown).

The list of external configuration profiles 230 includes a prompt to "configure John's cell phone for optimal clarity" and details at least one alternative display configuration setting.

The configuration selection options 240 enable a user to select an alternative display configuration setting from the list of external configuration profiles 230.

Figure 3:
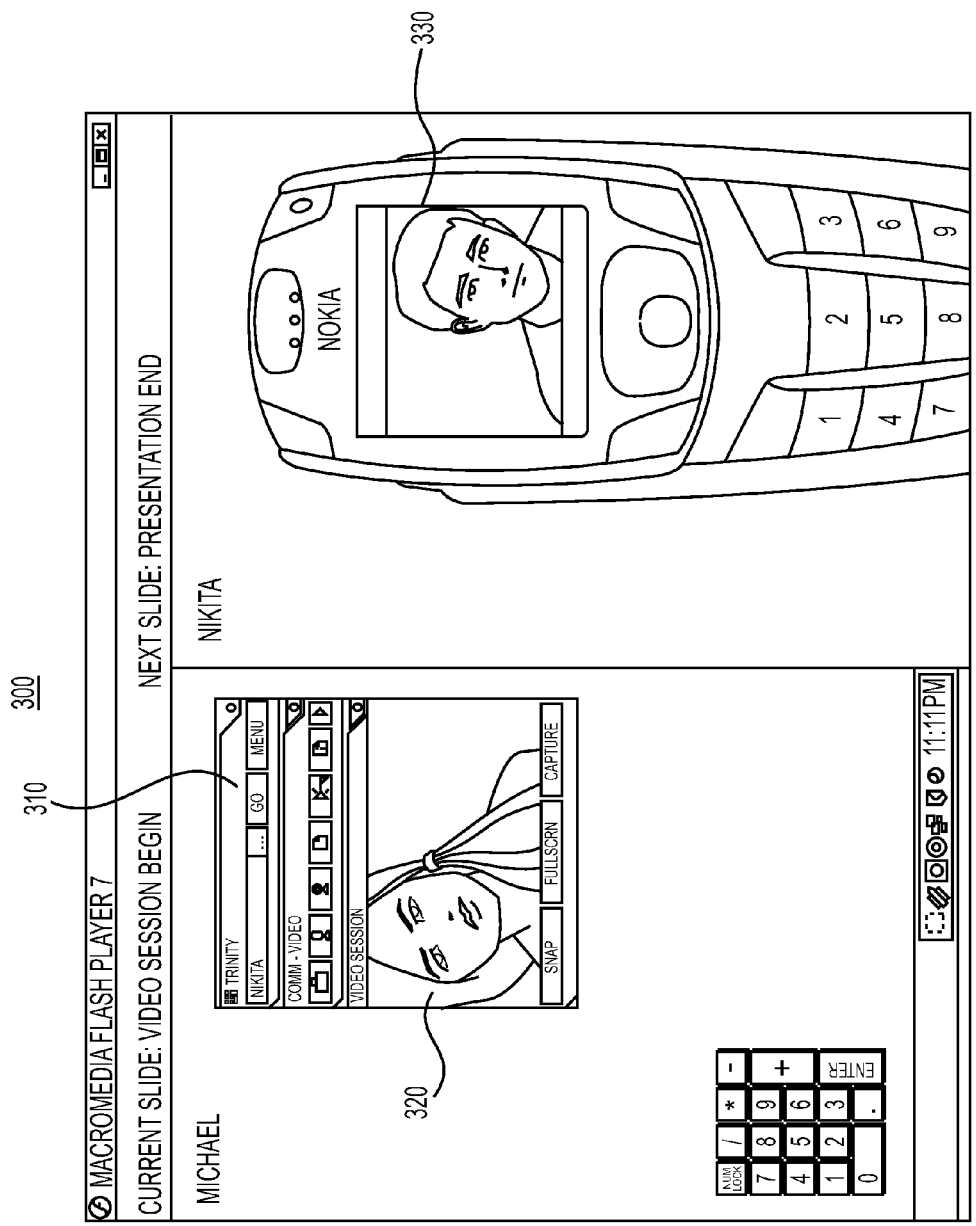
FIG. 3 is an example of a graphical user interface of a system to provide automatic configuration adjustment.

FIG. 3 is a GUI 300 of an exemplary desktop application that is exchanging communications with the destination communications device 330. The desktop application is configured to automatically reconfigure a destination communication device using an alternative display configuration setting. As shown, GUI 300 includes software options 310, and a media input screen on the sender communications device 320. The desktop application exchanges communications with the destination communications device 330 (a wireless phone).

Software options 310 enable a user to select options on the software directed to the initiation of a communications session. The software options 310 enable automatic analysis and adjustment of hardware and software configuration so as to automatically render aspects of otherwise unperceivable content in communications exchanged between the sender and destination communication devices. For example, by selecting a "launch video conference" button in the software options 310, a user may initiate a video conference between the sender and destination communications devices using display configuration settings responsive to (1) the state of the local communication device; and/or (2) the state of the remote communication device.

The media input screen on the sender communications device 320 is a display that may be used to show text, video (as shown), or other multimedia in a communications session that is received from the destination communication device. As shown, the media input screen on the destination communications device 330 includes video content captured on the sender communication device.

Figure 4:
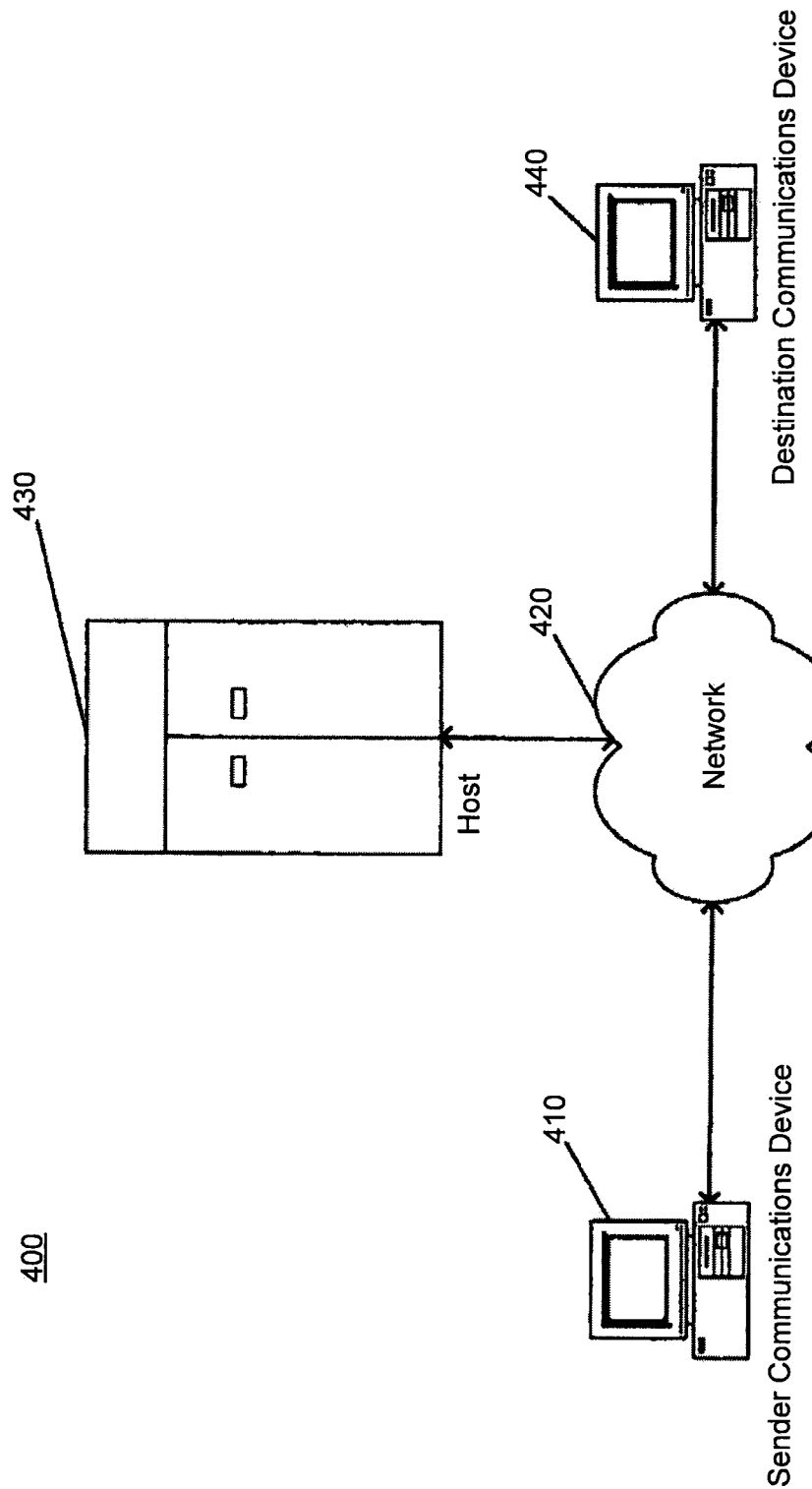
FIG. 4 is a block diagram of an exemplary communications system configured to reconfigure the display configuration settings.

FIG. 4 is a block diagram of an exemplary communications system 400 configured to reconfigure the display configuration settings. Communications system 400 includes a sender communications device 410, a network 420, a host 430, and a destination communications device 440.

Each of the sender communications device 410, the host 430, and the destination communications device 440 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. Other examples of general-purpose computers include a notebook computer, a PDA ("Personal Digital Assistant"), or a wireless phone. The sender communications device 410 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the sender communications device 410. The host 430 and the destination communications device 440 may be configured or structured similar to the sender communications device 440.

The sender communications device 410 and the destination communications device 440 may include one or more devices capable of accessing content on each other or the host 430. In one implementation, each of the sender communications device 410 and the destination communications device 440 includes one or more information retrieval software applications (e.g., a browser, a mail application, an instant messaging client, an Internet service provider client, or a media player) capable of receiving one or more data units. The information retrieval applications may run on a general-purpose operating system and a hardware platform that includes a general-purpose processor and specialized hardware for graphics, communications and/or other capabilities. In another implementation, the sender communications device 410 and the destination communications device 440 may include a wireless telephone running a micro-browser application on a reduced operating system with general purpose and specialized hardware capable of operating in mobile environments.

More particularly, the sender communications device 410 and the destination communications device 440 may be configured to exchange communications. The sender communications device 410 and destination communications device 440 may be configured to identify a display configuration setting to reconfigure the display configuration setting using, for example, an alternative display configuration setting. The analysis or adjustment of a display configuration setting may be directed to a local configuration for a local device or directed to a destination communication device across the network 420.

The network 420 includes hardware and/or software capable of enabling direct or indirect communications between the sender communications device 410 or the destination communications device 440 and the host 430. As such, the network 420 may include a direct link between the sender communications device 410 or the destination communications device 440 and the host 430, or may include one or more networks or sub networks. Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 430 may be configured to support or exchange communications with the sender communications device 410 and the destination communications device 440. The host 430 may include a code segment configured to analyze and/or adjust configuration of hardware or software components in the sender communications device 410 or the destination communications devices 440. In one configuration, the host is configured to receive a request from one client in order to adjust configuration of another client. In yet another implementation, the host 430 is configured to analyze communications exchanged between the sender communications device 410 and the destination communications device 440. The host 430 then may be configured to adjust configuration responsive to the analysis. Aspects of the host 430 may be embodied permanently or temporarily in any type of machine, component, physical or virtual equipment, storage medium, or propagated signal capable of providing instructions.

Figure 5:
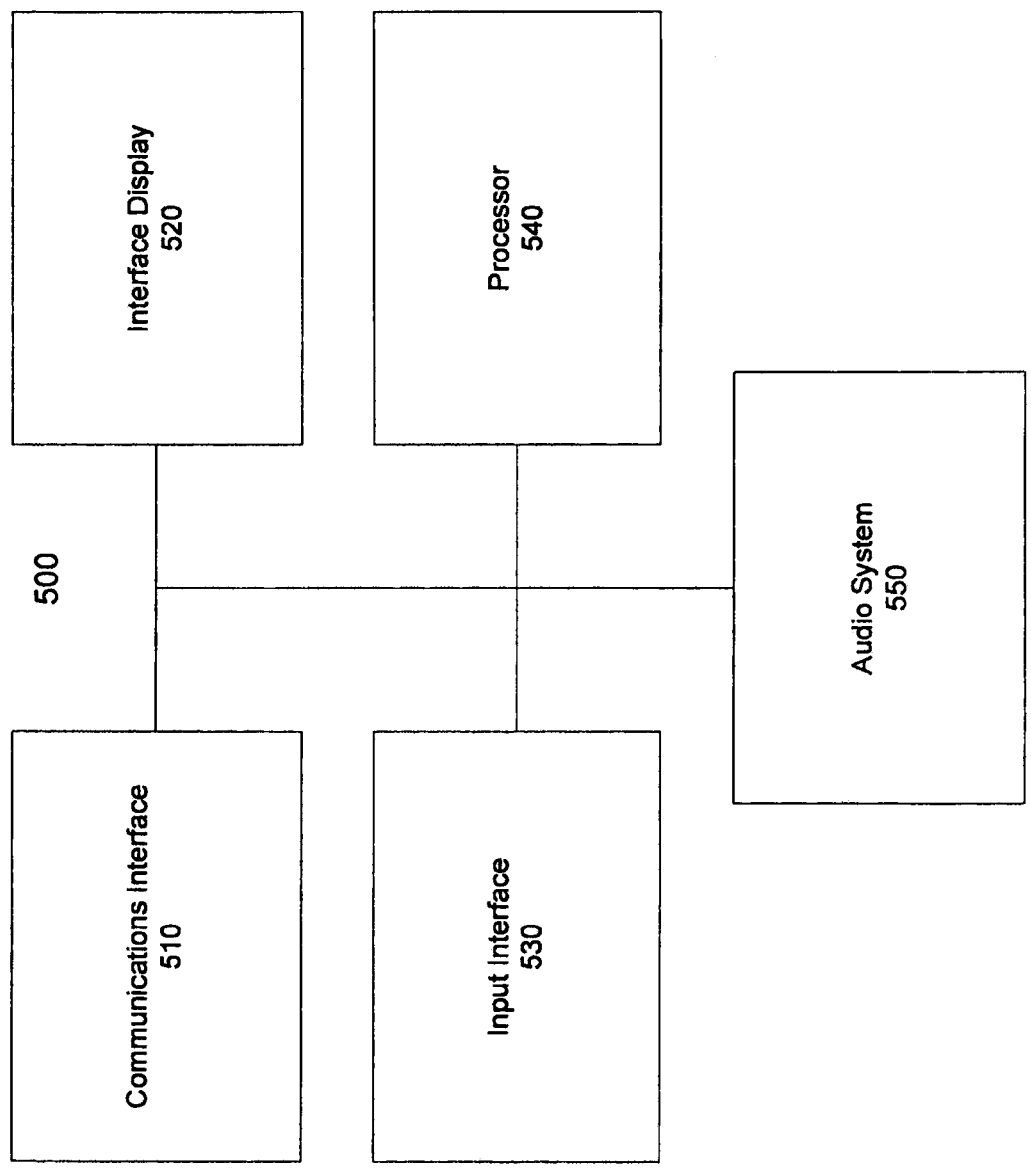
FIG. 5 is an example of a block diagram of a communications device.

FIG. 5 is an exemplary block diagram of a communications device 500. In one implementation, communications device 500 represents the communications devices and/or clients described previously with respect to FIGS. 1-4. The communications device 500 includes a communications interface 510, an interface display 520, an input interface 530, a processor 540, and an audio system 550.

Generally, the communications interface 510 enables the exchange of data with other devices, such as a computer or wireless phone. The exchange of data may be over, for example, a wired or wireless data pathway capable of carrying and receiving data. Examples of a communications interface 510 include network interfaces with the Internet, the World Wide Web, a WAN ("Wide Area Network"), a LAN ("Local Area Network"), analog or digital wired and wireless telephone networks, radio, television, cable, satellite, and/or other delivery mechanisms for exchanging data. The communications interface 510 may include controls that, for example, limit network utilization, specify a security configuration for a firewall, or perform authentication operations. The communications interface 510 may be configured to interface with the processor 540 and/or the input interface 530 to perform these and other operations and also to exchange content.

The interface display 520 includes componentry enabling user perception of content. Examples of the interface display 520 may include, for example, a monitor, such as a liquid crystal display (LCD) or an organic light emitting diode (OLED) screen. The interface display 520 also may include display configuration settings (e.g., controls) that specify, for example, a frame rate setting, a color setting, a resolution setting, a brightness setting, and/or a contrast setting.

The input interface 530 includes componentry enabling user input. Examples of devices representing the input interface 530 may include, for example, a microphone, a keyboard, a mouse, a camera, a toggle, a joystick, a dial, or a touchscreen. The input interface 530 may include sensitivity settings, volume settings, or brightness setting and may interface with a menu system to provide a greater degree of flexibility for the input interface.

The processor 540 may include a central processor unit (CPU) and may include a controller configured to analyze display configuration settings and adjust display configuration settings responsive to user selection of an alternative display configuration setting.

The audio system 550 may include componentry enabling audio perception of content. Examples of the audio system 550 may include a speaker, for example, within a wireless phone or a set of headphones. The audio system 550 may also include a controller that specifies, for example, volume, stereo or mono, or sound quality settings.

Figure 6:
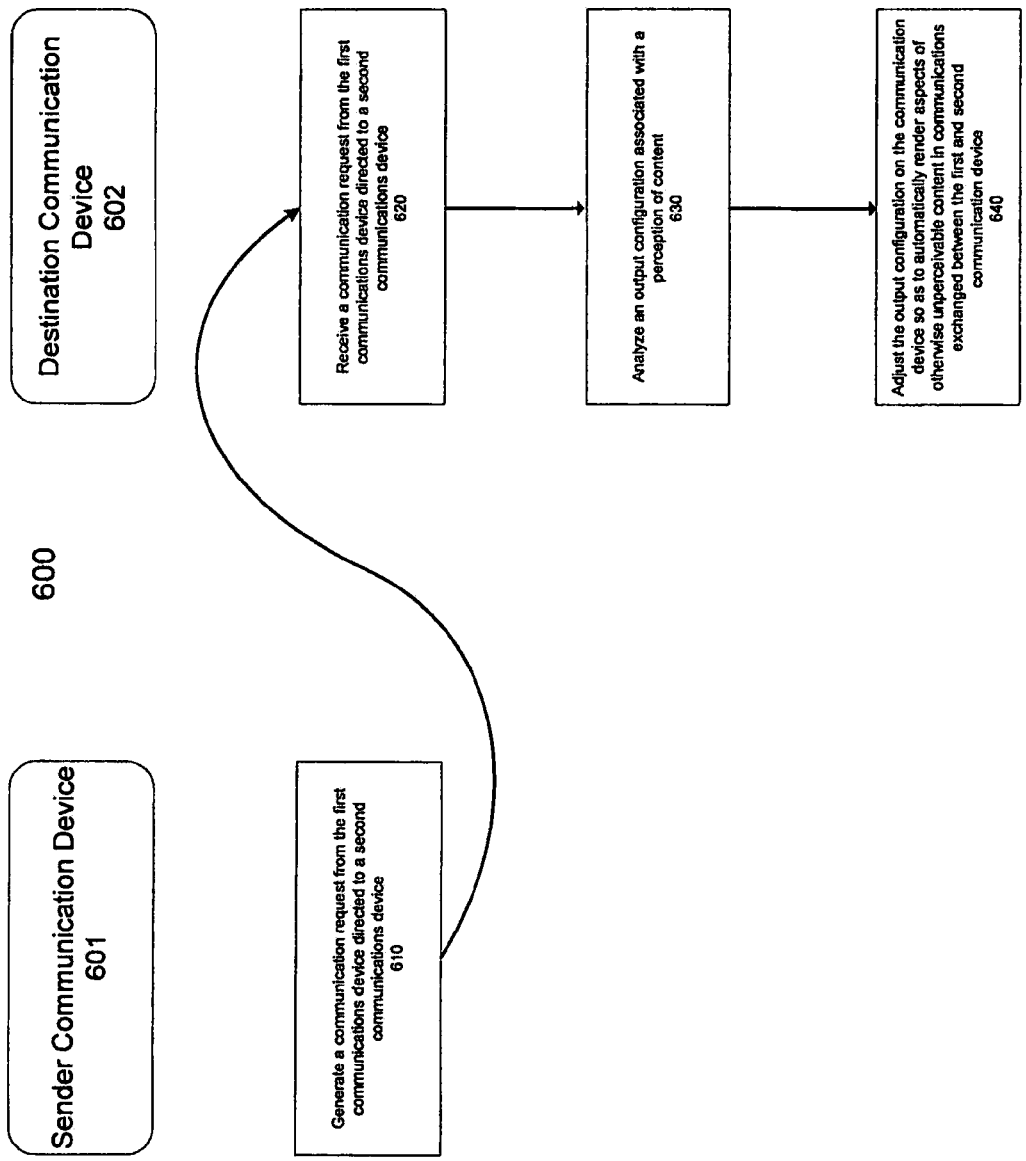
FIG. 6 is an example of a process for adjusting configuration settings.

FIG. 6 is a flow chart 600 of an exemplary process by which the display configuration settings may be configured. Typically, flow chart 600 represents a sequence of operations as a sender communications device 601 establishes communications with a destination communications device 602. Although the operations are described with respect to the particular sequence shown, the operations shown in flow chart 600 may be performed in a different order.

The sender communication device 601 generates a communications request directed to the destination communication device 602 is generated (610). For example, the sender communication device 601 may transmit a request to engage in a video conference.

The communications request is received by the destination communication device 602 (620). The display configuration settings that control the display of content by the destination communication device (e.g., destination communication device) is identified (630). For example, the destination communication device may determine that a first microphone setting, a first brightness setting, and a first speaker setting are being used by a conferencing application while a second microphone setting, a second brightness setting, and a second speaker setting are being used as general purpose device settings for the destination communication device.

At least one alternative display configuration setting to be used by the destination communication device in displaying the received content is identified (640). For example, the destination communication device may determine that the destination communication device is being used in a crowded night time environment using a camera to record ambient lighting conditions and a microphone to record ambient audio conditions. The destination communications device may identify a special configuration setting for crowded evening environments and recommend that the special configuration setting be used. Other examples of identifying an alternative display configuration setting may include identifying, for example, a speaker volume setting, a microphone sensitivity setting, and a display resolution setting.

As a result, the display configuration settings are reconfigured so as to display the received content based on the identified alternative display configuration settings. In one implementation, the display configuration setting on the destination communications device 602 is adjusted so as to automatically render aspects of otherwise unperceivable content in communications exchanged between the sender 601 and destination 602 communications device. In one implementation (not shown), the sender communications device 601 receives an indication of the display configuration device settings for both the sender communications device 601 and the destination communications device 602, and responds by suggesting alternative display configuration settings for both devices.

Figure 7:
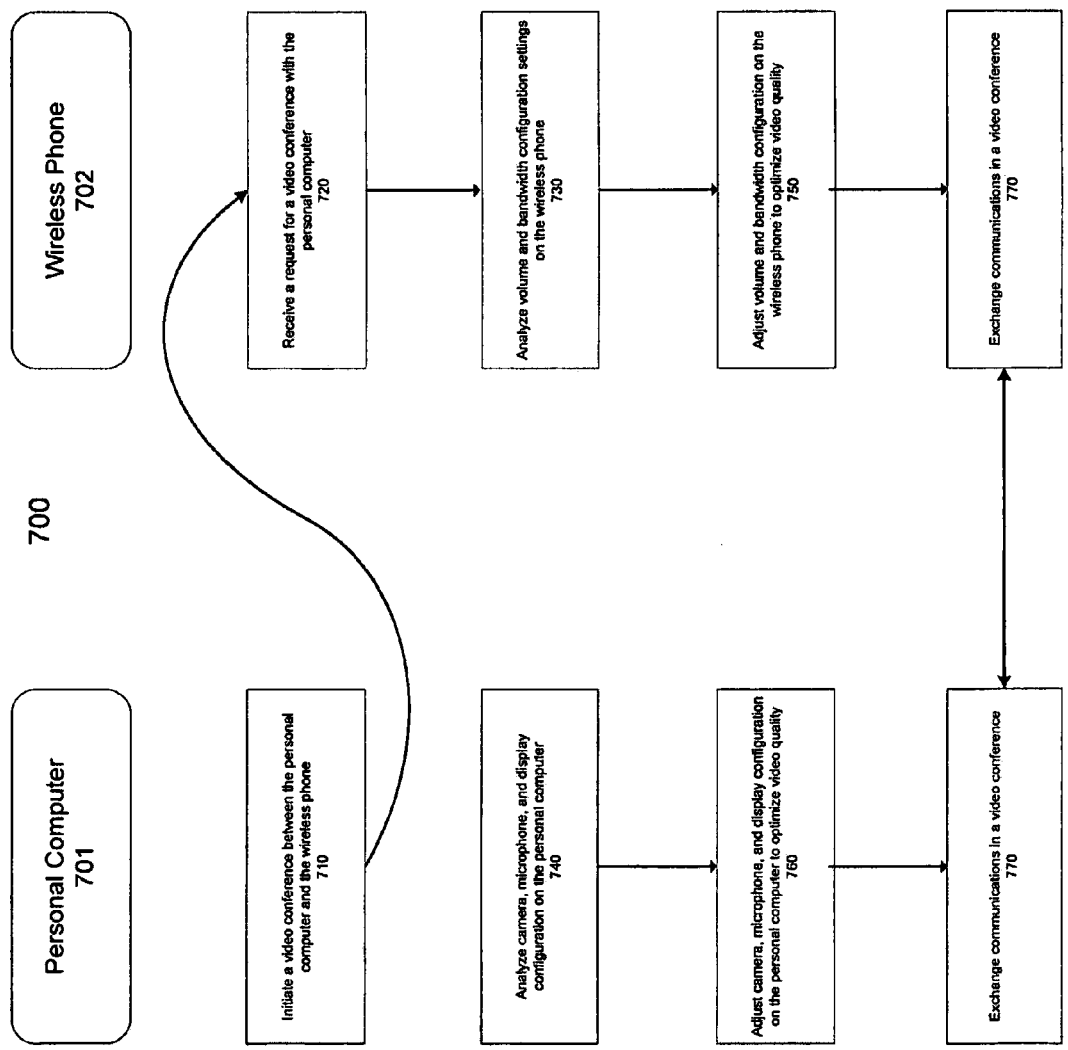
FIG. 7 is an example of a process for adjusting configuration settings on a personal computer and a wireless phone.

FIG. 7 is a flow chart 700 of an exemplary process 700 by which display configuration settings are reconfigured for a video conference between a personal computer 701 and a wireless phone 702.

A video conference between the personal computer 701 and the wireless phone 702 is initiated by the personal computer 701 (710). A request to initiate the video conference is received by the wireless phone 702 (720). The video conference includes audio and video components.

Settings for the volume and bandwidth configuration on the wireless phone 702 are analyzed (730). The camera, microphone, and display configuration on the personal computer 701 are analyzed in parallel on the personal computer 701 (740). Typically, the analyzed configurations are evaluated to determine whether an alternative display configuration setting should be used to increase the quality or perceivability of the video conference.

The volume and bandwidth configuration on the wireless phone 702 are adjusted to optimize video quality (750). The camera, microphone, and display configuration on the personal computer 701 also are adjusted (760). In one implementation, a display configuration setting is adjusted in order to maximize quality and reception of the streamed information. For example, a microphone sensitivity on the personal computer 701 may be increased to compensate for limited volume controls for a speaker associated with the wireless phone 702 speaker volume (as well as compensating for conditions related to a high level of background noise surrounding the wireless phone 702).

In one example of optimizing video quality, the personal computer 701 and the wireless phone 702 identify one or more problematic settings and/or conditions that impact or have the potential to adversely impact the video conference. As a result, an alternative display configuration setting may be identified that corrects the problematic setting (e.g., a microphone sensitivity may be adjusted). Users on the personal computer 701 and the wireless phone 702 are then prompted to reconfigure their own respective devices using the proposed alternative display configuration settings.

Communications are then exchanged in a video conference (770) between the personal computer 701 and the wireless phone 702.

Although the operations described in flow chart 700 related to adjusting a configuration on a personal computer 701 and a wireless phone 702, other operations may be performed that include different operations or perform the operations in a different order. For example, camera, microphone, and display settings on the personal computer 701 may be analyzed (740) prior to the wireless phone (702) receiving the initiation of the video conference between the personal computer 701 and the wireless phone 702. As a result, the personal computer may suggest a configuration for the wireless phone 702 in the request to initiate the video conference.

Figure 8:
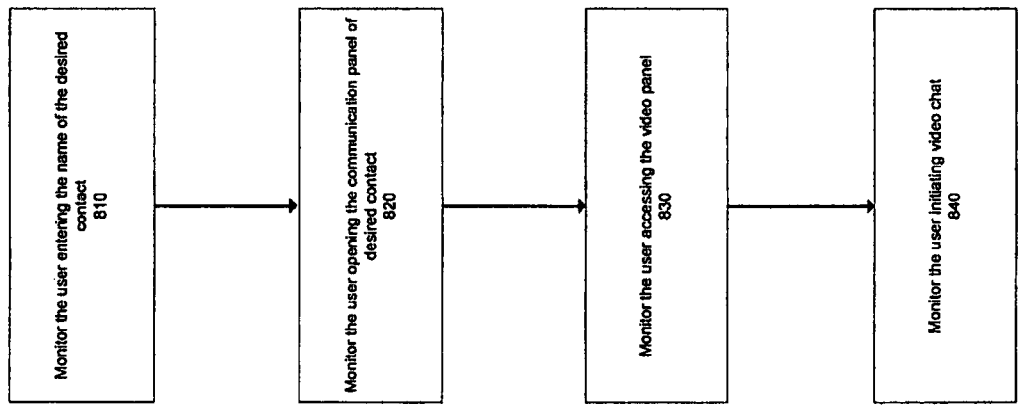
FIG. 8 illustrates an exemplary block diagram of a system to monitor user behavior.

FIG. 8 is a flow chart 800 of an exemplary process by which a video chat session is initiated. In particular, flow chart 800 illustrates how user behavior may be monitored in order to generate a display configuration setting that may be automatically or selectively invoked in subsequent operations. Typically, the operations described in flow chart 800 may be performed on the systems and components described earlier in the application. For example, the operations shown in flow chart 800 may be performed on the sender communications device 410 or the destination communications device 440 described with respect to FIG. 4.

Initially, a code segment on a communication device (e.g., an Internet Service Provider (ISP) client on a personal computer) monitors a user entering the name of the desired contact (810). The code segment may monitor the name that is selected, the action that is performed, the state of the communications device, and/or a combination of the operations described above. For example, the code segment may first record that a particular contact name was selected. The code segment then may record the state of the communications device (e.g., the ISP client was launched from a work environment). Finally, the code segment may record that a particular action (or sub-action related to the particular action) was performed.

The code segment then determines that the user opened a communications panel for the desired contact (820). For example, the code segment may record that the user launched a communications panel enabling a user to select from several forms of communications (e.g., email, instant messaging, Voice-over-IP, video conferencing). The code segment may determine that other actions have been performed in between the time at which the user entered the name of the desired contact (810) and the time at which the user opened the communications panel (820). For example, the code segment may determine that a user adjusted a display size (e.g., resizing a Window™ or frame) or adjusted a communications setting (e.g., by selecting a desired bandwidth).

The code segment determined that the user accessed the video panel (830). For example, the code segment may determine which of several video options were selected or that an alternative display configuration setting was selected.

Finally, the code segment determines that the user initiated the video chat (840). Other examples of operations performed by the code segment may include identifying actions selected by the user, recording events occurring during a conference (e.g., failure conditions and/or actions take responsive to a failure condition) and categorizing user behaviors such as determining how a user interacts with a particular user and/or group of users (e.g., by frequently using full screen video chat).

Figure 9:
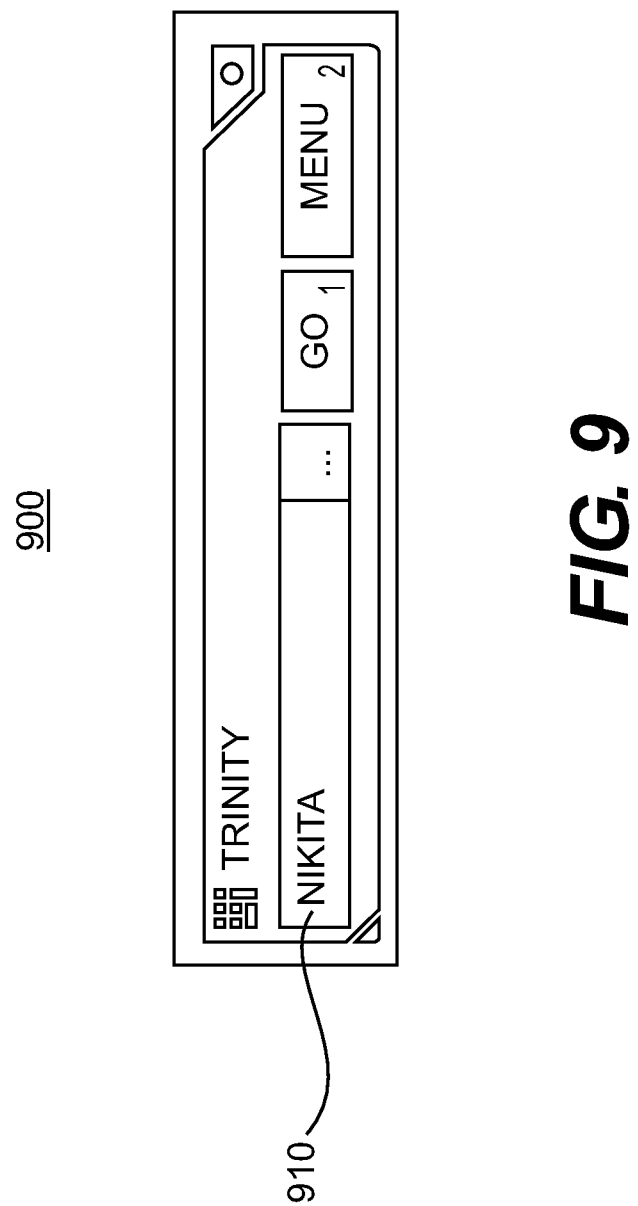
FIG. 9 illustrates an exemplary graphical user interface of a system to monitor entering a user name.

In GUI 900, FIG. 9 illustrates how user actions may be monitored in order to generate a display configuration setting. In particular, GUI 900 illustrates that a code segment may monitor a user entering a contact name (e.g., the user entered a contact name as described previously with respect to operation 810 in FIG. 8). By monitoring user behavior with respect to a contact name, frequently-performed operations may be identified and used to suggest or automatically invoke a display configuration setting. As shown, 900 illustrates that the user name "Nikita" has been entered into a communications portal 910.

Figure 10:
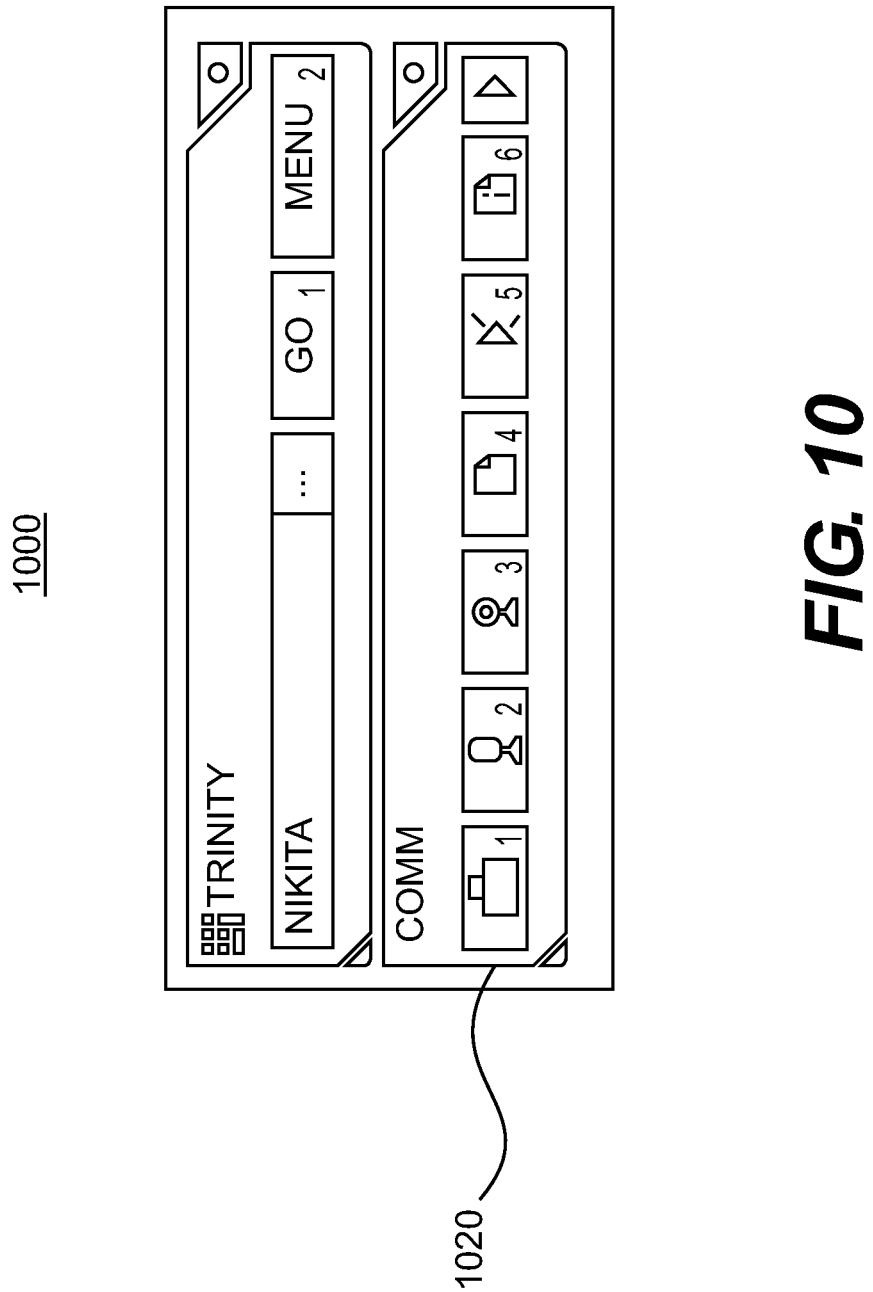
FIG. 10 illustrates an exemplary graphical user interface of a system to monitor opening a user's communications panel.

In GUI 1000, FIG. 10 illustrates how user actions may be monitored after the user has identified a contact name. As shown, GUI 1000 illustrates the communications panel 1020 rendered in response to the user entering "Nikita" as a contact name in the communications portal (e.g., the user opened communications panel as described previously with respect to operation 820 in FIG. 8). Typically, one or more buttons in the communications panel 1020 may be selected to launch a communications application (e.g., video conferencing) or configure a setting related to the communications portal 1010. The code segment may monitor which actions are performed (e.g., which buttons in the communications panel 1010 have been selected) in order to categorize user behavior. Categorizations of the user behavior may be used, in turn, to identify and suggest alternative display configuration settings.

Figure 11:
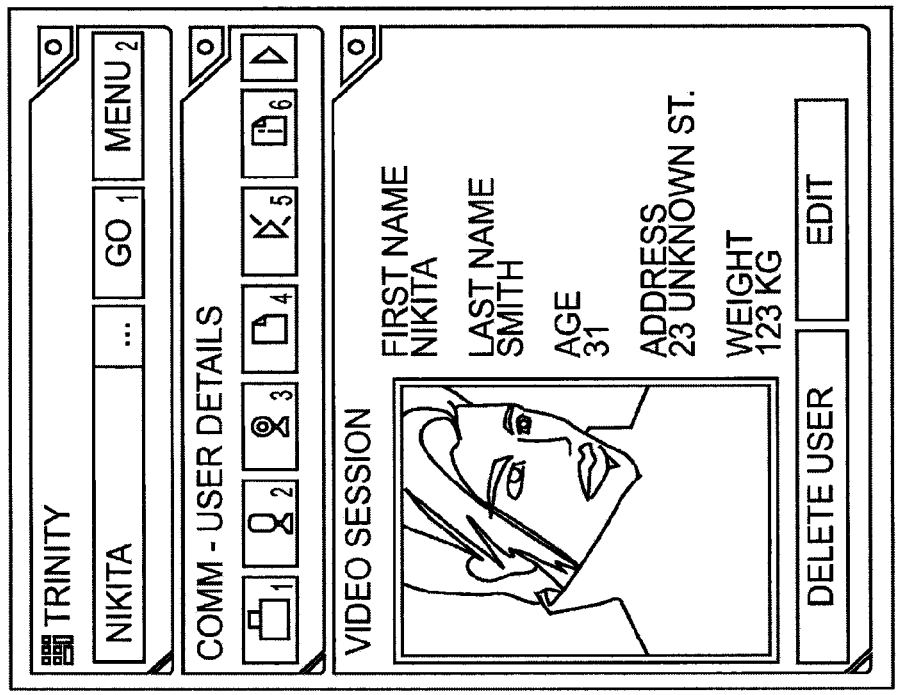
FIG. 11 illustrates an exemplary graphical user interface of a system to monitor accessing a communications panel's video panel.

In GUI 1100, FIG. 11 illustrates how a code segment may monitor user sub-actions to categorize user behavior. GUI 1100 illustrates that the user is accessing the video panel in response to selecting a video panel button described previously with respect to 1100 (e.g., the user accessed the video panel as described previously with respect to operation 830 in FIG. 8).

Figure 12:
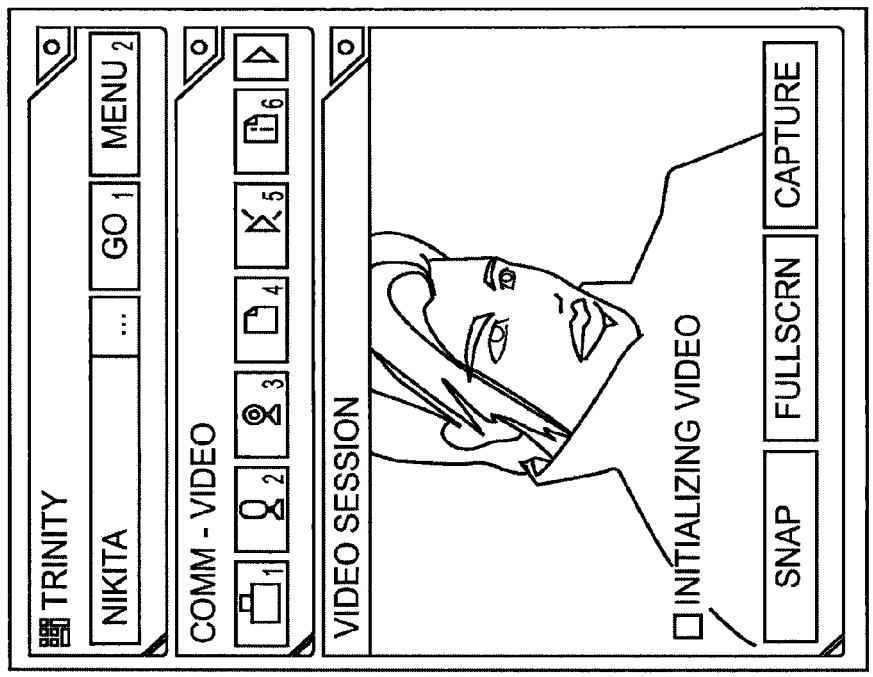
FIG. 12 illustrates an exemplary graphical user interface of a system to monitor initiating video chat.

In GUI 1200, FIG. 12 illustrates how a code segment may monitor a user initiating a video chat session (e.g., the user initiated a video chat session as described previously with respect to operation 840 in FIG. 8).

Figure 13:
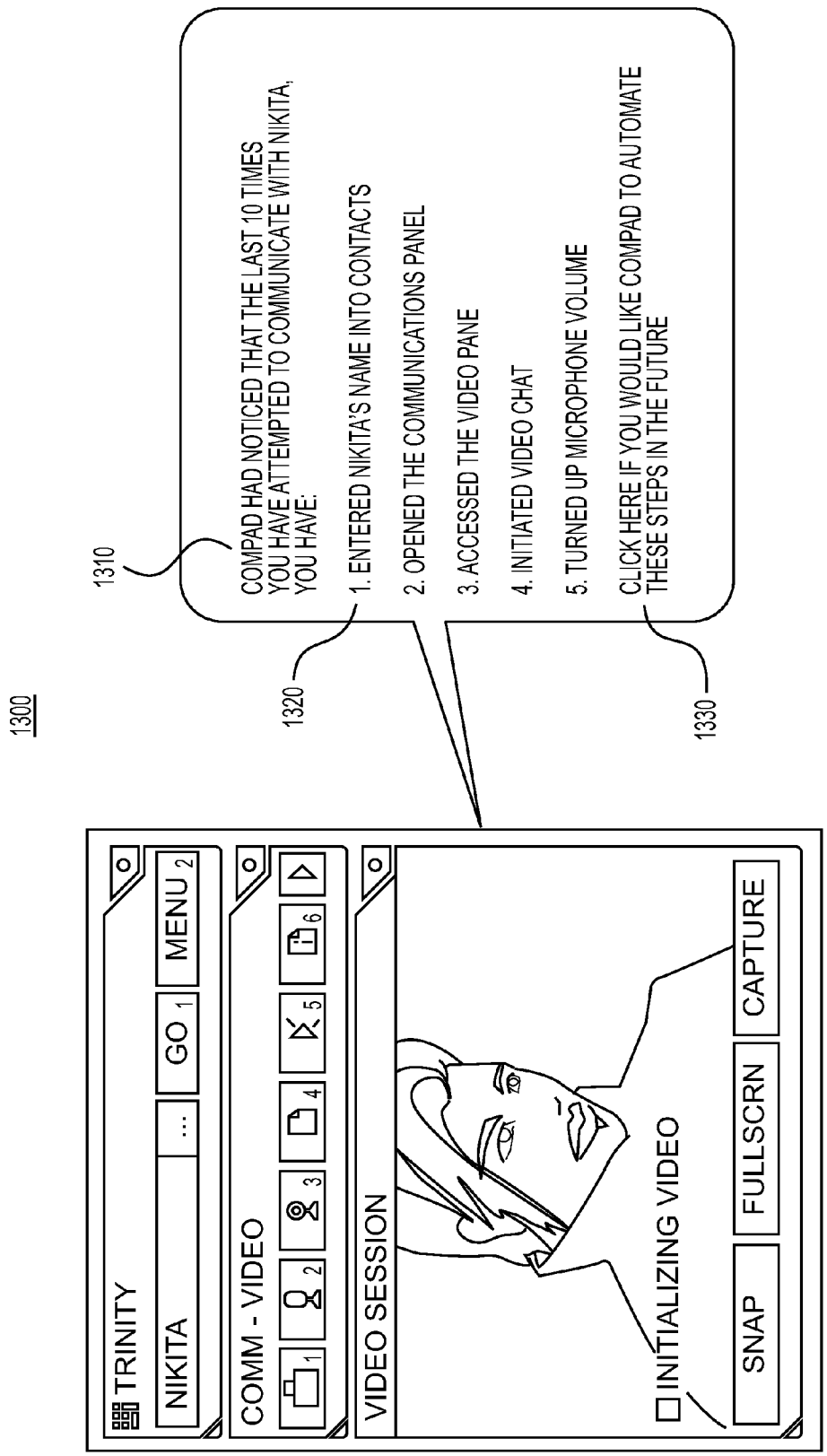
FIG. 13 illustrates an exemplary graphical user interface of an offer to automate user behavior.

Referring to FIG. 13, a GUI 1300 illustrates how monitoring user behavior may be used to automate user actions. GUI 1300 includes a communications application 1310, a behavior synopsis 1320, and an offer to automate 1330. GUI 1300 may be generated in response monitoring user operations in a communications application 1310.

The behavior synopsis 1320 includes a categorization of how a user exhibits certain behaviors with respect to the communications application. As shown, the behavior synopsis 1320 includes the number of consecutive instances a user has engaged a behavior with respect to a particular contact (Nikita). In another implementation, the behavior synopsis 1320 is presented as a frequency or a total number of occurrences irrespective of uninterrupted repetition (e.g., the user performed the same sequence of operations with Nikita 83% of the time).

The behavior synopsis 1320 also specifies the particular user behaviors that have been recorded as reoccurring. The behavior synopsis 1320 may highlight key steps of recorded behavior, or include a more detailed list user behavior.

The offer to automate 1330 gives the user the option to automate the recorded behaviors. The offer to automate 1330 may include an offer to automate as detailed in the behavior synopsis 1320. Alternatively, the offer to automate may enable a user to edit the operations performed. The offer to automate 1330 may include an offer to accept or edit.

Figure 14:
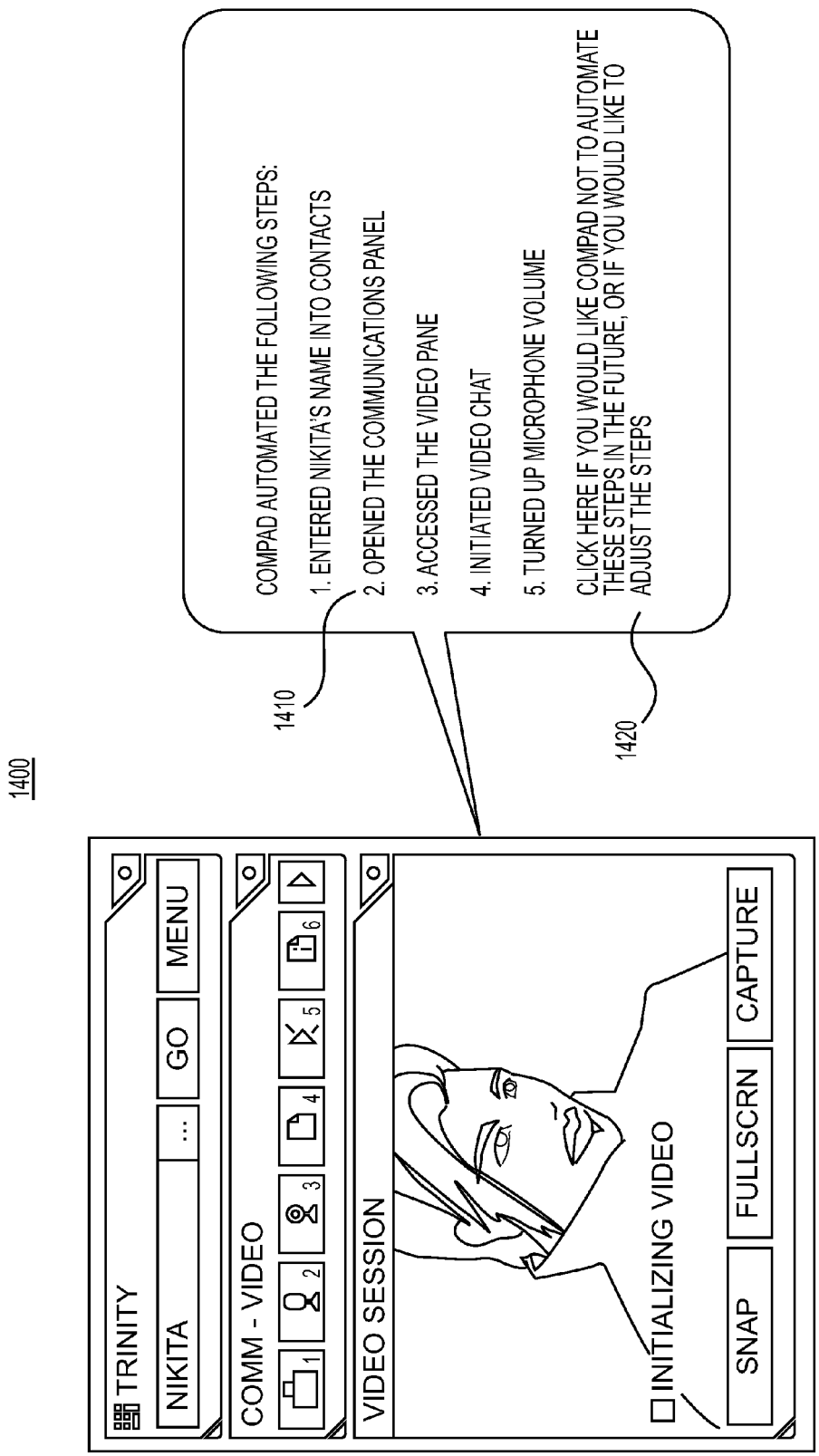
FIG. 14 illustrates an exemplary graphical user interface of a confirmation request to automate user behavior.

FIG. 14 illustrates a GUI 1400 that provides a user with an indication that an automated routine based on user behavior has been automatically adopted. The GUI 1400 includes an automation synopsis 1410 and an "offer-to-discontinue" automation 1420. Automation synopsis 1410 provides a description of the operations indicative of the user behavior. The "offer-to-discontinue" automation 1420 indicates that the automated synopsis has been invoked without user acquiescence but provides the user to with an option to discontinue receiving similar messages in the future. In one implementation, the "offer-to-discontinue" automation 1430 also may provide the user with an option to discontinue automation of the recorded behaviors. Still, another implementation may enable a user to discontinue automation entirely or to edit automation of a particular class of operations (e.g., automatically use video conferencing if the selected user belongs to a group of co-workers in an instant messaging list of online identities (e.g., a "Buddy List"). In one configuration, GUI 1400 is presented before the behavior has been identified and/or automated. In another configuration, GUI 1400 is presented after the behavior has been identified and/or automated.

Referring to FIG. 15, an exemplary table 1500 illustrates how user behavior may be monitored. The table 1500 includes a contacts-accessed field 1510, a communications-type entry 1520, a user-state entry 1530, and a user-actions entry 1540. The table 1500 may reflect the results of monitoring user behavior. In one implementation, the table 1500 represents a data object (e.g., an array or system of pointers) used to automate invocation of configuration settings based in part on user behavior(s).

The contacts-accessed entry 1510 identifies the contacts (e.g., online electronic identities) that the user has accessed. The contacts-accessed entry 1510 also indicates a number of times that the user has accessed each contact.

The communications-type entry 1520 indicates which actions have been selected by a user to communicate with the selected contact. For example, the user may exchange communications using instant messaging (text), audio conferencing, or video conferencing.

The user-state entry 1530 includes parameters that may be used to more precisely categorize and/or distinguish between user behaviors based on a context in which a communications device is being used. Examples of parameters that may be described in a user-state entry may include a description of a type of device accessing the contact (e.g., a personal computer or wireless phone), a time of day, a location of the communications device (local and remote), and ambient conditions for both local and remote communications receives (e.g., temperature, lighting, noise conditions).

The user-actions entry 1540 records a specific action. Examples of actions that may be described in the user-action entry 1540 may include an indication that application settings have been manipulated (e.g., volume level and microphone level), or an indication that particular windows or programs have been opened or closed.

Other implementations describing user behavior may be organized differently and may include different or fewer elements. For example, a table may include additional columns of more detailed sub-actions that are performed after related action has been selected.

Referring to FIG. 16, exemplary table 1600 illustrates how user behavior may be categorized with respect to an application. As shown, table 1600 includes an application-accessed entry 1610, a user-state entry 1620, and a user-actions entry 1630. The table 1600 may represent a model of user behavior based, for example, on the monitoring operations described previously with respect to FIGS. 9-15. In one implementation, the table 1600 represents a data object used to reconfigure a communications device.

The application-accessed entry 1610 indicates which applications have been accessed by the user. The application-accessed entry 1610 also includes the number of times the user has accessed each application.

The user-state entry 1620 includes state information that may be used to more precisely categorize or distinguish between different user behaviors or behavior patterns. Examples of state information may include an indication of the type of device accessing the contact, a time of day, an indication of prior or concurrent behavior, and an indication of other programs concurrently running.

The user-actions entry 1630 indicates a specific action that has been performed by a user. Examples of user-actions may include an indication of a particular manipulation of an application (e.g., by opening or closing windows, frames, or programs). In another implementation, the table 1600 includes additional columns used to describe user sub-actions selected by a user that are related to user actions that have been selected by a user.

What is claimed is:

1. A method comprising:
   establishing a video communication between a first device of a first user and a second device of a second user, wherein the first device and the second device each has one or more display configuration settings, one or more media configuration settings, and one or more network configuration settings for the video communication;
   detecting a state of at least one of the first device or the second device;
   modifying the one or more display configuration settings, the one or more media configuration settings, and the one or more network configuration settings of the first device or the second device based on a set of one or more display configuration settings, one or more media configuration settings, and one or more network configuration settings previously used in accordance with the detected state of the first device or the second device; and
   enabling display of the video communication to the first user or the second user based on the modified display configuration settings, media configuration settings and network configuration settings.

2. The method of claim 1, wherein detecting the state further comprises detecting a surrounding environment associated with the first device or the second device.

3. The method of claim 1, wherein detecting the state further comprises determining a geographic location.

4. The method of claim 3, further comprising using a global positioning system to determine the geographic location.

5. The method of claim 1, further comprising using an IP address to detect the state of at least one of the first device or the second device.

6. The method of claim 1, further comprising utilizing a wireless communication device to detect the state of at least one of the first device or the second device.

7. The method of claim 1, wherein detecting the state of at least one of the first device or the second device comprises determining a noise level of an environment of at least one of the first device or the second device.

8. A system comprising:
   at least one processor; and
   a non-transitory computer-readable medium storing instructions that, when executed by the at least one processor, cause the system to:
   receive a request to establish a video communication between a first device of a first user and a second device of a second user, wherein the first device and the second device each has one or more display configuration settings, one or more media configuration settings, and one or more network configuration settings for the video communication, and
   detect a state of at least one of the first device or the second device,
   modify the one or more display configuration settings, the one or more media configuration settings, and the one or more network configuration settings of the first device or the second device based on a set of one or more display configuration settings, one or more media configuration settings, and one or more network configuration settings previously used in accordance with the determined state of the first device or the second device, and
   enable display of the video communication to the first user or the second user based on the modified display configuration settings, media configuration settings and network configuration settings.

9. The system of claim 8, wherein the detected state of the first device or the second device further comprises a surrounding environment associated with the first device or the second device.

10. The system of claim 8, further comprising instructions that, when executed by the at least one processor, causes the system to detect a geographic location.

11. The system of claim 10, further comprising instructions that, when executed by the at least one processor, causes the system to determine the geographic location based on data from a global positioning system.

12. The system of claim 8, wherein the state is detected based an IP address.

13. The system of claim 8, further comprising instructions that, when executed by the at least one processor, causes the system to utilize a wireless communication device to detect the state.

14. The system of claim 8, further comprising instructions that, when executed by the at least one processor, causes the system to determine a noise level of an environment of at least one of the first device or the second device.

15. A non-transitory computer-readable storage medium storing a set of instructions that, when executed by a processor, cause a computer system to:
   establish a video communication between a first device of a first user and a second device of a second user, wherein the first device and the second device each has one or more display configuration settings, one or more media configuration settings, and one or more network configuration settings for the video communication;

detect a state of at least one of the first device or the second device;

modify the one or more display configuration settings, the one or more media configuration settings, and the one or more network configuration settings of the first device or the second device based on a set of one or more display configuration settings, one or more media configuration settings, and one or more network configuration settings previously used in accordance with the determined state of the first device or the second device; and enable display of the video communication to the first user or the second user based on the modified display configuration settings, media configuration settings, and network configuration settings.

16. The non-transitory computer-readable storage medium of claim 13, wherein detecting the state of at least one of the first device or the second device comprises determining an environment associated with a geographic location of the first device or the second device.

17. The non-transitory computer-readable storage medium of claim 15, wherein detecting the state of at least one of the first device or the second device comprises determining a noise level of an environment associated with the first device or the second device.

* * * * *